Sept. 21, 1965

H. A. BING ETAL 3,207,052

CAMERA APPARATUS FOR EXPOSING AND
PROCESSING PHOTOGRAPHIC FILM

Filed May 15, 1962

INVENTORS
Herbert A. Bing
Patrick C. Zinelli
Francis T. Gianino
BY
Brown and Mikulka
ATTORNEYS

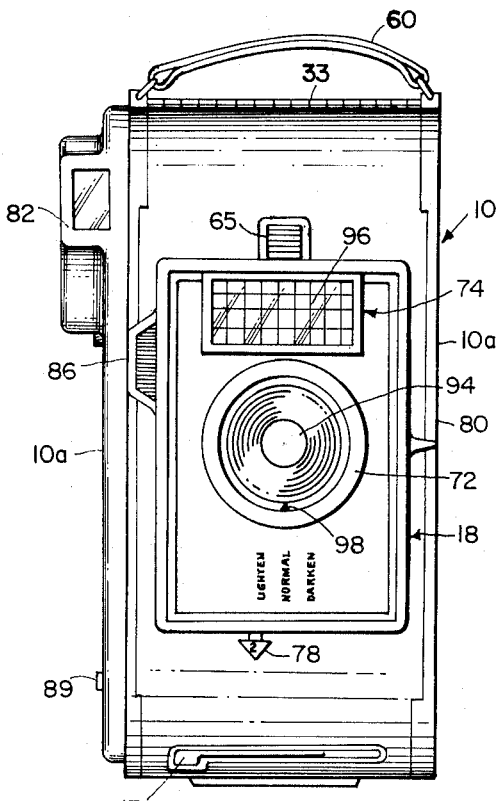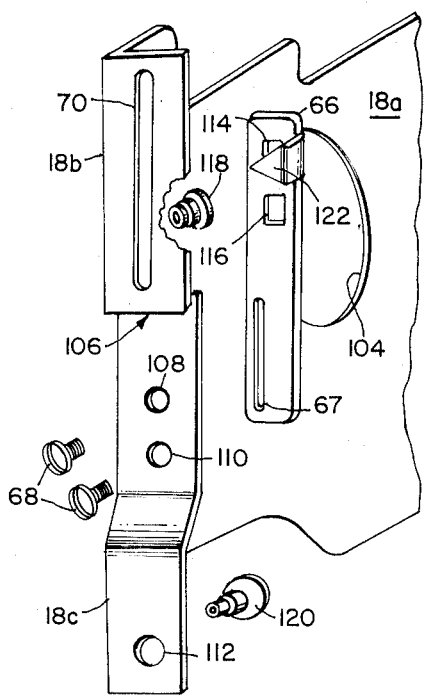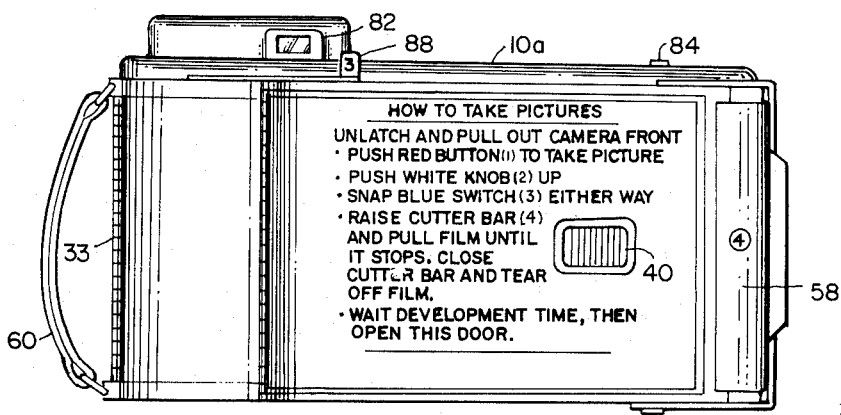

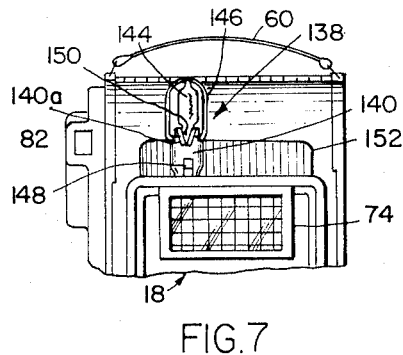
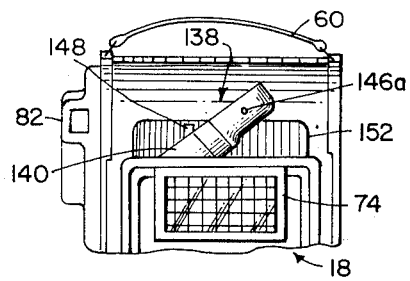
FIG.7　　　　　　FIG.8
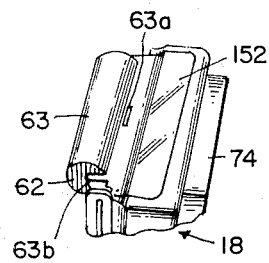
FIG.9
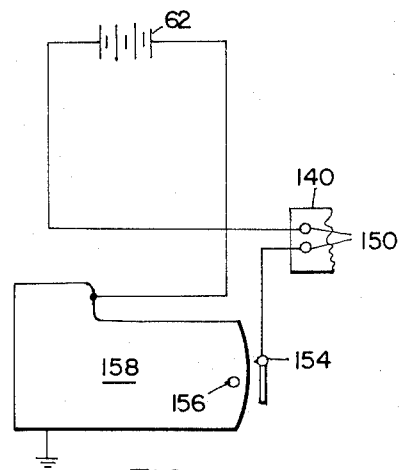
FIG.11
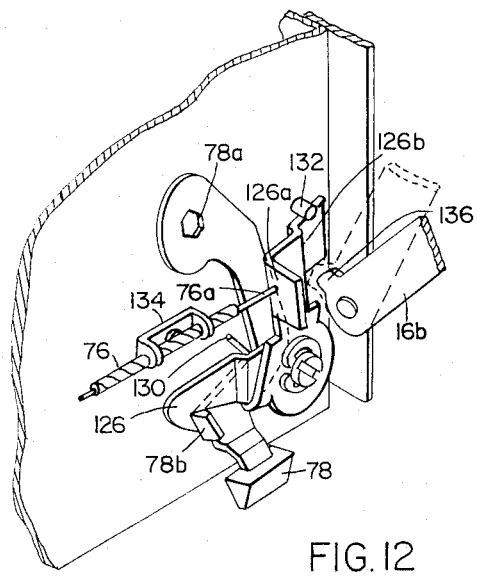
FIG.12
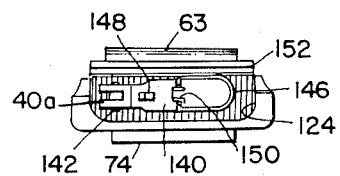
FIG.10

United States Patent Office 3,207,052
Patented Sept. 21, 1965

3,207,052
CAMERA APPARATUS FOR EXPOSING AND
PROCESSING PHOTOGRAPHIC FILM
Herbert A. Bing, Wellesley, Patrick L. Finelli, Sudbury, and Francis T. Gianino, North Weymouth, Mass., assignors to Polaroid Corporation, Cambridge, Mass., a corporation of Delaware
Filed May 15, 1962, Ser. No. 194,922
2 Claims. (Cl. 95—11.5)

This invention relates to camera apparatus for exposing and rapidly processing photographic film materials to provide a completed print of high quality, the film materials being of a type which includes photosensitive and image-receiving elements and a releasably contained processing liquid.

Objects of the invention are to provide, for use with film materials of the character described, an extremely compact and simple-to-operate, hand-held folding photographic camera having novel and coordinated features which, together, permit the obtaining of prints of consistently high quality; to provide in a camera, as described, interlocking elements which permit an exposure to be made only when the camera front is properly extended and the focal plane is properly established; to provide a camera of the character described in which are incorporated novel flashgun and battery mounting and enclosure means; and to provide a camera of the aforementioned type wherein both shutter speed and visual light-indicating means are adjusted automatically in response to existing ambient light conditions.

Other objects of the invention will in part be obvious and will in part appear hereinafter.

The invention, accordingly, comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a front view of the camera;

FIG. 4 is a rear view of the camera;

FIG. 6 is a diagrammatic exploded view of focus adjusting mechanism of the camera;

FIGS. 7 and 8 are fragmentary views of the camera front showing two alternate positions of the flashgun;

FIG. 9 is a fragmentary perspective view of the camera front showing the flashgun and battery mounting means;

FIG. 10 is a plan view of the camera front which further illustrates the flashgun and battery mounting means;

FIG. 11 is a wiring diagram of the flashgun circuit; and

FIG. 12 is a diagrammatic perspective view of portions of the shutter cocking and release mechanism illustrating interlocking safety elements which operate to prevent actuation of the shutter except at correct extended position of the camera front.

Figure 2:
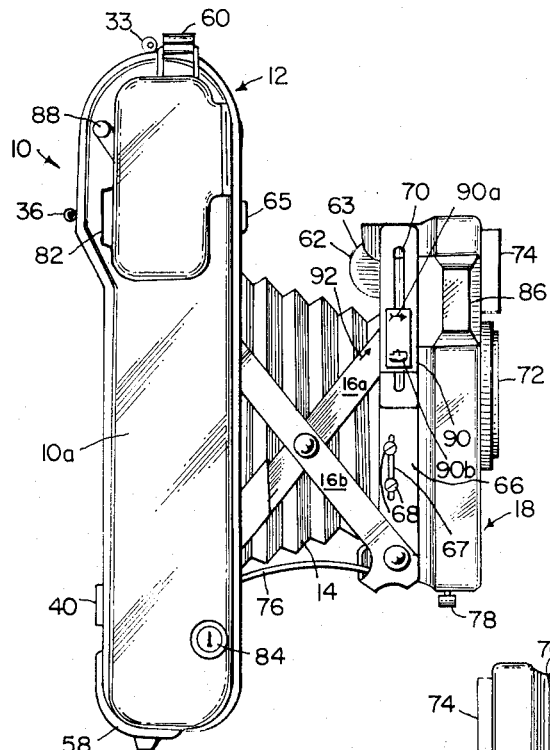
FIG. 2 is an elevation view of the camera taken from the right-hand side.

A camera of the type exemplified herein comprises means for supplying and exposing a photographic material which includes a film or layer of a photosensitive silver halide emulsion carried by a base or supporting layer and for rapidly processing the emulsion after its exposure to provide a positive print. Through the diffusion transfer of image-forming substances, the processing operation provides the completed positive print on a second film or sheet material which may be termed the image-receiving sheet or surface and which is either integral with the first-mentioned film or supplied separately in the camera and brought to superimposition therewith for the processing operation. A processing liquid is releasably contained on or within one of the materials, preferably in a rupturable liquid container attached to the image-receiving sheet, and is spread throughout the exposed emulsion area, when superimposed with the sheet, through movement of the materials relative to pressure-applying members of the camera. The image-receiving sheet may, of itself, serve as an image-receiving layer for a visible print of a latent image formed in the emulsion by the photographic exposure or it may carry a surface coating specially serving such a purpose. The diffusion transfer of image-forming components from the emulsion to the image-receiving surface to produce the print involves the development of a latent image in the exposed emulsion to silver. In the case of producing a black-and-white image this is accompanied by the formation in the emulsion of a soluble silver complex which is caused to transfer to the image-receiving sheet. In the production of a print in color, dye image-forming substances such as dyes or color couplers are employed for transfer to the image-receiving surface.

Photographic materials and processes of the general type contemplated in the aforementioned diffusion transfer operations are described in detail in U.S. Patents Nos. 2,543,181, 2,968,554 and 2,983,606 and in the copending application of Land et al., Serial No. 565,135, filed February 13, 1956. The camera apparatus described herein is not strictly limited to particular types of photosensitive and image-receiving films. However, in general, materials of the above-described types are eminently suited for use therewith. More particularly, the camera is especially adapted to use with a "fast" film of the category mentioned in the copending application of Land et al., Serial No. 564,492, filed February 9, 1956. One such "fast" film having an A.S.A. film speed of 3000 is now being commercially sold by applicants' assignee.

The camera of the present invention may be characterized, broadly, as a self-processing camera. More particularly, it may be regarded as of a compact, hand-held, automatic type, employing photoelectric means for establishing proper shutter speed settings, in conjunction with manually adjustable diaphragm openings and manually actuated but simplified predetermined focusing settings. Other features of the camera, some of which are novel and others conventional, together with special combinations thereof will now be described in detail. Whereas certain of these features may bear a resemblance to those heretofore employed in other cameras in the self-processing or in different fields, they are so employed and combined herein as to provide a picture-taking device which has one or more marked advantages over previous cameras of a generally related category in such respects as compactness, simplicity, flexibility, and ease of operation and by reason of its ability to produce prints of extremely high quality.

Figure 1:
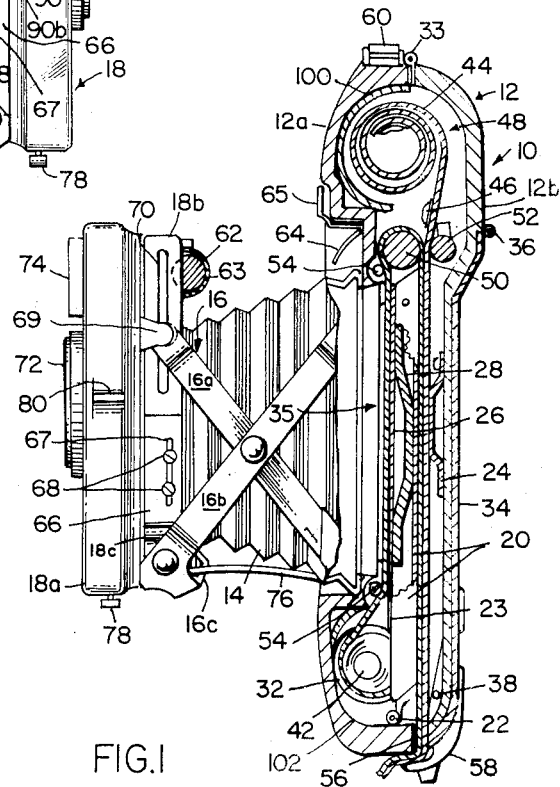
FIGURE 1 is an elevation view, partly in section, of the camera of the invention taken from the left-hand side.

Referring now to the drawings, the camera 10 is shown in FIG. 1 from the left-hand side and will be noted as being a hand-held camera of a folding type which, at closed position, has dimensions of approximately 7½" x 4½" x 2½" and is thus more compact than any automatic camera of a related type which has been commercially introduced. Basically, the camera comprises a main housing or back 12 containing processing apparatus in which a film is positioned for exposure and processing, a bellows 14, a scissors type erecting mechanism 16, and a front 18, the latter containing the principal elements for accomplishing the photographic exposure including a photovoltaic cell, the lens, shutter and diaphragm components, and a flashgun with associated battery, to be described in detail. At exposure position, the bellows extends only 2½ inches beyond the camera back. This relatively short distance necessitates a special mechanism to automatically establish the shutter release button linkage at functional position when the bellows is fully extended and to remove it therefrom at any other position.

The camera back 12 is constructed of metal as, for example, principally of sheet steel to provide the necessary strength and rigidity, a plastic sheath or overlay 10a being provided at indicated areas for external appearance and to facilitate the mounting of elements such as the viewfinder. The camera front 10 is substantially entirely constructed of a plastic. The plastic material employed in the aforesaid construction is Tenite II, Formula 400A, manufactured by Tennessee Eastman Co., U.S.A., although it will be obvious that other plastics may be used for the purpose. The structure of the camera back 12, containing the film processing apparatus, may be considered as generally similar to that of other folding cameras of a related type but possessing certain unique features which will appear hereinafter. The back 12 is divided into two principal chambers, namely, into what may be termed a front or exposure chamber and a rear or processing chamber, by pivotal wall member 20, the latter being hingedly connected to the casing at 22. The terms front and rear, as used herein, in referring to the location of components, relate to their proximity to or remoteness from, respectively, the front of the camera or the object being photographed. The forward position of pivotal member 20 is established by flange elements 23 extending from the casing and by a pair of spring finger elements 24 (one shown) attached to the rear wall of the housing and bearing against the rear edges of member 20. A pressure plate 26 biased by a spring 28, respectively attached thereto and to pivotal wall member 20, taken with frame elements 30, holds the film material 32 properly at the focal plane of the camera. The camera back is constructed of front and rear wall sections 12a and 12b, respectively, pivotally connected to one another at hinge 33 and held at closed position at the bottom by a latch 13, shown in FIG. 3. The rear wall section 12b, in turn, includes an access means thereinto in the form of a door 34, hinged at 36 and having a latch 38 with release button 40. Door 34 is employed, primarily, to enable removing each completed print from a continuous strip of image-receiving sheet material along semi-perforations of the latter.

A supply of the film 32, in roll form, is contained on a spool 42. A supply of the image-receiving sheet material 44 composed, for example, of a roll of baryta-coated paper and having a plurality of rupturable containers 46 releasably holding a processing liquid which are located at given intervals on the image-receiving surface, is somewhat loosely mounted in an appropriate compartment or sub-section 48 of the camera back.

A pair of pressure rolls 50 and 52 is mounted within the camera back. These rolls are employed to apply pressure to the exposed film 32 and image-receiving sheet 44 when they are drawn therebetween in superimposed relation, as shown, and to rupture the liquid container and spread the processing liquid throughout the emulsion area. Pressure roll 50 is mounted on pivotal member 20 of front section 12a while pressure roll 52 is mounted in rear section 12b, the two rolls being positioned contiguously with their axes on a line substantially at 90° to the direction of withdrawal when these two camera sections are pivoted to closed position.

The photosensitive film material 32 and sheet 44 are loaded in the camera by first opening the rear section 12b and then swinging the inner pivotal wall member 20 to open position. As above explained, the pressure rolls are thus separated and access to the interior is provided. A leader of the film 32 is drawn across the focal plane 35, past guide rolls 54 and between the guide rails 55, shown in FIG. 5. When the front and rear camera sections 12a and 12b are closed, film 32 passes around pressure roll 50 and across the rear surface of pivotal member 20. A leader of the image-receiving sheet 44 is positioned between pressure roll 52 and the leader of film 32 so as to lie to the rear of and in superimposed relation with the latter. The most advanced portions of the two leaders are then positioned in an exit aperture 56 provided by a narrow gap between the front and rear sections 12a and 12b so that a small tab of the leaders extends exteriorly of the housing. The film and receiving sheet materials are usually supplied as components partially attached to one another and thus may be considered as constituting a single unit or integral film material. Complete instructions are provided on the film package for installing and metering the materials to functional positions such that emulsion areas are properly positioned for exposure and the liquid containers and image-receiving areas of the image-receiving sheet are properly positioned relative to the exposed image areas of the film. This occurs automatically once the leaders have been threaded. A pivotal cutter bar 58, adjacent to the exit aperture 56, has a cutting blade which is movable across the aperture and serves to sever lengths of exposed and processed negative film material as well as waste portions of the image-receiving sheets, the latter being connecting portions of the strip which remain after removal of each print. Where the film is of a type which produces a permanent negative, the negative is, of course, preserved.

Further considering the camera back 10, a handle 60 is included for carrying purposes. A recessed area 61 is provided in the camera back 12 for accepting elements associated with front 18 when the latter is retracted to closed position. More particularly, the recessed portion 61 serves to accept battery 62 which constitutes a voltage supply for a flashgun, to be described. The battery is releasably mounted in a clip 63. Structure relating thereto is shown in FIGS. 9 and 10 and will be described in further detail below. A pair of flat spring elements 64, one shown, is mounted at the lateral extremities of recessed area 61. A latch 65 holds the front at closed position against the slight bias provided by spring elements 64. When latch 65 is released, the springs 64 cause the front to move outwardly by a small amount enabling the operator to then complete the bellows extension and erection of the camera front with ease.

The camera front 18 is connected at either side of bellows 14 with the back 10 by scissors type supports 16 comprising link elements 16a and 16b. The links 16b are connected at the bottom by a cross-piece 16c, unitary therewith, and their upper extremities are slidably mounted in vertical tracks (not shown) provided within the sides of the camera back 10. The bellows 14 is constructed of any suitable material such, for example, as a cloth material impregnated with a plastic, and provides the necessary light-tight enclosure between the lens and the focal plane. On each side of the camera front is an adjusting plate 66 having a slot 67 formed therein and a pair of adjusting screws 68 which pass through the slot and are threaded in the wall of the front 18. These elements are employed to perform a preliminary or factory collimating adjustment, namely, an adjustment of the spacing between the lens and the focal plane. A further reference to this adjustment will be given below relative to FIG. 6. Other elements shown in FIG. 1 include a two-position detent-actuating clasp or button 69 which permits optional insertion of a stud 118 (shown in FIG. 6) in either of two recesses. The shank of the stud passes through slot 70 and is attached to the extremity of link 16a. This structure permits adjustment of focus to two positions. Also shown are the diaphragm adjusting bezel element 72, the photoelectric cell 74, the shutter release actuating cable 76, and the shutter cocking lever 78. A short protuberance or balancing foot 80, integral with front 18, extends outwardly so as to support the camera when it is positioned horizontally on a flat surface.

In FIG. 2, the camera is shown from the right-hand side. Elements additional to those illustrated in FIG. 1 include a viewfinder 82, shutter release button 84 and an indicator 86 of the light available for the exposure. The light indicator 86 comprises a dial and a pointer actuated by a galvanometer, not shown, mounted within front 18. The galvanometer is responsive to voltage fluctuations of the photovoltaic cell 74 and, in turn, controls the shutter speed, as will be explained hereinafter. When the pointer is located in a small triangularly shaped area of the dial, the light level is so low as to indicate the need of adjusting lens bezel 72 and using a flashgun, to be described, in making the exposure. At other positions of the pointer, the light level is indicated as being sufficient for performing the exposure. Otherwise stated, there is provided a degree of light incident upon the photovoltaic cell 74, and, coincidentally, upon the film when the shutter is actuated, which will enable automatic control of shutter operation to produce a satisfactory print.

Further referring to FIG. 2, a lever 88 actuates detent means, not shown, for controlling the proper positioning of photosensitive areas of the film materials for exposure and for metering given lengths of the materials for processing. Also shown is a plate 90 containing symbolic indicia for use in establishing proper focus for general and close-up photography. Plate 90 is secured to the face of a detent-actuating button similar to button 69 of FIG. 1 and movable therewith when the two are squeezed together. The plate 90 contains a picture of one or more human figures 90a, symbolizing a setting for general picture taking, e.g., from approximately five feet to infinity, and a human head 90b representing a setting for close-up picture taking, e.g., from approximately three and one-half feet to eight feet. An arrow 92, formed on link 16a, points toward one or the other of these symbols depending upon whether the subject is located for a "general" setting or for a "close-up" setting. The plate 90 of FIG. 2 and the detent button 69 of FIG. 1, when squeezed inwardly, release a locking stud 118 from it location in one of the two apertures 114 and 116, shown in detail in FIG. 6, and enable its placement in the other aperture. This operation is performed by moving the camera front 18 in or out causing movement of the shank of the stud, which is attached to the extremity of link 16a, along slot 70 while coincidentally moving the upper extremities of links 16b along their tracks in the camera back. When the stud 118 is located in the upper aperture, as represented by arrow 92 pointing toward human figure symbol 90a, the scissors supports 16 are slightly closed and the spacing between the lens and focal plane is diminished. When the stud 118 is in the lower aperture the arrow 92 points toward the face symbol 90b, the scissors supports 16 are slightly opened and the spacing between the lens and focal plane is at its maximum distance. The foregoing mechanism permits a rapid and simple adjustment of focus according to variations in distance between the camera and the photographic subject merely by pressing elements 69 and 90 together and moving the camera front in or out, as required, to reposition the arrow 92.

In FIG. 3, the camera 10 is illustrated from the front. Elements not previously shown include the single, front-curving, meniscus lens 94, the latch 13 which is pivotable outwardly toward the viewer to release the front and rear casing sections 12a and 12b from closed relation, and a honeycomb type of grill 96 covering the face of the photovoltaic cell 74. The diaphragm aperture is varied in size and shape by rotating the bezel 72. The index mark 98 on the bezel is turned either to the "lighten" or "darken" positions designated on the camera front, as may be indicated as necessary by the position of the pointer of the light indicating dial 86 or by the quality of a just-previously-completed print. Assuming that a subject at practicable range is being photographed, the flashgun may be used if additional light is required. The viewfinder 80, shown at open position, may be of any suitable type, a so-called "Albada" type of viewfinder being that preferably employed.

The camera is illustrated from the rear in FIG. 4. This view shows more clearly the detent actuating lever 88 for controlling the positioning of the film materials and the cutter bar 58 which is pivotally mounted and used to sever lengths of print carrying film materials. Also shown is a series of instructional steps relating to the photographic exposure and processing operations. The numbers refer to those appearing on the actuating elements, as shown in FIGS. 2, 3 and 4.

Figure 5:
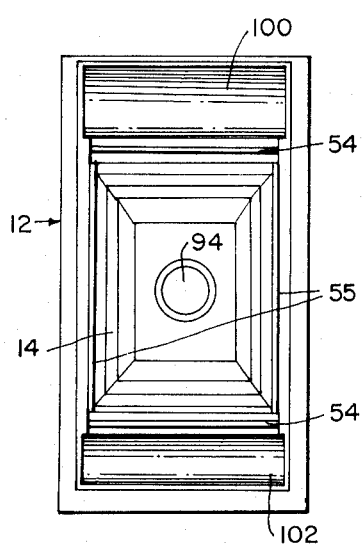
FIG. 5 is a diagrammatic interior view of the camera showing film guide means at the focal plane.

FIG. 5 shows the interior of the camera back 12, looking forwardly from the focal plane. Included are semi-enclosures 100 and 102 for holding the image-receiving material 44 and the photosensitive film 32, respectively. Also shown are the lens 94, bellows 14 and guide rails 55, the latter holding the film against lateral misalignment at the focal plane.

FIG. 6 illustrates in greater detail the preliminary collimating adjustment means previously mentioned with respect to FIG. 1. Inasmuch as it is viewed from the left-hand side, however, it may most clearly be understood relative to FIG. 2. Plate element 18a is that portion of the camera front or lens board 18 within which, in aperture 104, the meniscus lens and diaphragm are mounted and around which aperture the lens bezel is positioned. Element 18b is a right-angled plate integral with, but projecting outwardly beyond, element 18a, as shown. Element 18c is a plate, contoured as shown, having perforations 108, 110 and 112, and is an element integral with and extending at 90° from an edge of plate element 18a. However, plates 18b and 18c are spaced from one another as shown at 106. Elements 18a, 18b and 18c are preferably formed of a rigid metallic sheet material such as steel. Plate 66, formed of a resilient material, such as a resilient metal, and having two rectangular apertures 114 and 116 and an elongated slot 67, is positioned in the space 106 between plates 18b and 18c so that slot 67 is aligned with apertures 108 and 110 of plate 18c, and apertures 114 and 116 of plate 66 are aligned with slot 70 of plate 18b. A stud 118 is positioned between plates 66 and 18b with its shank protruding through slot 70 and passing through an eye in the upper extremity of the erecting link 16a (FIG. 2). Perforation 112 is connected with an eye in the lower extremity of the erecting link 16b by stud 120. Detent button 122 is that to which indicia plate 90 of FIG. 2 is attached, as previously described. Screws 68 pass through perforations 108 and 110 and slot 67 and are threaded in side portions of camera front 18. As will be apparent, when screws 68 are loosened, plate 66 can be moved up or down thus raising or lowering the location of rectangular apertures 114 and 116 into which the head of stud 118 may alternatively be positioned. The stud is released from its location in either of apertures 114 and 116 by pressing manually upon detent release button 122 underlying the plate 90. This serves to bend the resilient plate 66 inwardly, removing it from the stud and permitting the shank of the latter to slide freely in slot 70 as provided by link 16a when the camera front is moved inwardly or outwardly. By moving plate 66 upwardly or downwardly and when tightening the screws 68 a basic collimating setting is obtained. To summarize the operational settings, previously described with respect to FIG. 2 and the position of arrow 92, at 90a or 90b, are obtained by alternatively locating the head of the stud in apertures 114 or 116 merely by squeezing the detent elements 69 and 90 together and moving the camera front in or out.

The shutter and electrical switch actuating mechanism for firing a flashgun are housed in the camera front 18 and are not shown in complete detail inasmuch as they are generally similar to structures of a self-processing camera covered in the copending U.S. patent application, Serial No. 102,047. The flashgun is mounted in a recess or well 124 formed in one side of camera front 18, namely, in the upper side, assuming the camera to be held for vertical picture taking.

In brief, the shutter comprises two interacting movable blades, each being adapted to pass across the surface of the other, and across a diaphragm aperture during operation. Shutter speed is governed by a pneumatic bellows and valve. The valve aperture is controlled by galvanometer means in response to variations of current derived from the photovoltaic cell 74.

The shutter release mechanism is shown in FIG. 12. The shutter is placed at operative position by cocking lever 78, rigidly attached to one of the shutter blades by hexagonal aperture 78a. The cocking lever applies tension to the shutter driving spring when at cocked position. It is held at cocked position by the shutter release pawl 126 which engages contact element 78b of the cocking lever. Pawl 126 is biased toward engagement with the cocking lever by a spring 130 and its movement is limited by a stop 132. As illustrated in FIG. 12, the cocking lever 78 is to be considered as biased in a clockwise direction by the shutter spring, not shown, and the pawl 126 to be biased in a counterclockwise direction by spring 130. The release pawl 126 is actuated by the shutter release button 84 through the intermediary of the flexible cable 76. The tip of the actuating wire 76a in the flexible cable is located at a position, as provided by mounting bracket 134, to actuate contact element 126a of the pawl only when the camera is at a proper picture-taking position, with the camera bellows 14 and camera front-erecting linkage 16 properly extended. The link member 16b, at the side of the camera adjacent to the cocking lever, is provided with an outwardly-extending lug 136 at its extremity. At any position of the erecting linkage 16 other than that of correct extension for picture taking, lug 136 obstructs the extending contact element 126b of the pawl and prevents its rotation in response to linear movement of cable tip 76a. Accordingly, the shutter release button 84 is incapable of actuation and the pawl cannot be rotated to release the cocking lever and permit operation of the shutter.

FIGS. 7 through 10 illustrate mounting means for the flashgun and battery and various positions which the flashgun 138 may assume. The flashgun socket 140 is pivotally mounted at 142 in the recess 124. In FIG. 7, the flashgun, comprising bulb 144 and reflector 146, is positioned so as to face forwardly toward a photographic subject. The socket 140 includes a cut-away portion 140a, a pivotal bulb ejector 148 and a pair of terminals 150 permitting a conventional flashbulb base to be inserted from the side rather than from the end. This permits installing the bulb without removing the reflector 146, the latter being of a small size permitting the entire flashgun to be retracted therein. A pivotally mounted cover 152 provides a closure for the recess 124. Although so small in size, the reflector is adequate because of the extremely fast characteristics of the high speed film which the camera of the invention is adapted to utilize. Use of a compact reflector also tends to eliminate the so-called "hot spot" of light which is frequently found to be incident upon the photographic subject through the use of more conventional reflectors, which is of advantage. Reflector 146 is rotatably mounted on socket 140 and, when rotated 90° from the position shown, is suitably disposed for full bounce flash with camera held for horizontal picture taking.

FIG. 8 illustrates the flashgun at a 45° position to the vertical or horizontal for what may be termed partial bounce flash operation with respect to both overhead and side surfaces when the camera is held either vertically or horizontally, detent means engaging socket 148, but not shown, being provided for holding the socket positively at 45°. The small orifice 146a formed in reflector 146 complements the light of bounce flash by filling in areas which, because of their depth, might appear in shadow to an unwanted degree. Assuming a light bulb having a light output of approximately 7000 lumiseconds, a circular orifice having a diameter of ⅛ inch has been found to produce excellent results in its aforesaid capacity.

FIG. 9 illustrates the flashgun compartment with the cover 152 closed, it being assumed that the flashgun has been completely retracted therein. Also shown is the retaining cover 63 for battery 62. The cover is hingedly attached at 63a to camera front 18. A spring latch, not shown, holds cover 63 at closed position. When the cover is opened, the battery is easily removed from the spring clip members 63b contacting its extremities.

In FIG. 10 the flashgun 138, with bulb removed, is shown retracted within its recess or compartment 124. At this position and with bulb installed, it is properly disposed for full bounce flash operation relative to an overhead surface when the camera is held vertically. It is also positioned so as to permit closing of the cover 152 during non-use. Pressure applied manually to an extended portion or appendage 40a of the socket permits the flashgun to be pivoted easily to an outward position.

A wiring diagram is shown in FIG. 11 relating to a circuit comprising the battery 62, the socket 140, electrical contacts 154 and 156 identified with the shutter mechanism, not shown, and the mounting plate 158 for this mechanism. This circuit is employed for operating the flashgun 138. Timing considerations with respect to the closing of electrical contacts 154 and 156 make it advisable that they be closed at a point in time which is approximately twelve milliseconds prior to maximum alignment of the shutter and diaphragm apertures. This period permits the lamp filament to be heated to proper temperature for maximum brightness, and permits full transmittal of light for any diaphragm setting.

Since certain changes may be made in the foregoing apparatus without departing from the scope of the invention herein involved, it is intended that all matter contained in the above description or shown in the accompanying drawings shall be interpreted as illustrative and not in a limiting sense.

What is claimed is:

1. In a self-processing camera of a type adapted to employ exceedingly high speed film materials and having a back and an extensible front, the structure comprising an elongated narrow compartment formed in and extending substantially throughout the length of that side of said camera front which is uppermost when the camera is held for vertical picture taking, a miniature flash gun comprising socket means having a cut-away slot in one side thereof and manually actuatable ejection means for side mounting and ejection, respectively, of a flash bulb, a manually-actuated bulb ejector, and a hood-like reflector closely hugging said flash bulb and having one completely open side and a small aperture formed in another side thereof, said flash gun being so pivotally mounted in said compartment as, optionally, to be completely retracted thereinto or swung outwardly therefrom to 45°, 90° and intervening functional angular positions and held thereat by frictional means incorporated in part with socket means of said flash gun and in part with engaging means extending from a wall of said compartment, an elongated closure means hingedly connected at said uppermost side of said camera front for protectively sealing said compartment when said flash gun is retracted thereinto, and means attached to said camera front and located immediately behind said flash gun for releasably mounting and electrically contacting a battery for energizing said flash bulb, the location of said battery permitting electrical connections of a minimum length for the purpose, said battery mounting means including a pivotal cover for preventing, when closed, dislodgment of said battery from said mounting means, the aforesaid miniature characteristics of said flash gun being permitted by reason of its adapability to use with said high speed film materials.

2. In a camera, as defined in claim 1, the structure wherein said flash-gun reflector is so incorporated with said socket means and is so pivotally positionable relative to the direction in which the camera is focussed for picture taking as to permit a choice of upward, sideways and intermediate bounce flash as well as direct illumination of the subject, and wherein said reflector is automatically correctly positioned at a bounce flash setting when the flash gun is completely retracted in said compartment.

References Cited by the Examiner

UNITED STATES PATENTS

| | | | |
|---|---|---|---|
| 2,176,493 | 10/39 | Fuerst | 95—39 |
| 2,184,017 | 12/39 | Mittalyi | 95—39 |
| 2,671,387 | 3/54 | Knight | 95—11.5 |
| 2,844,081 | 7/58 | Wagner | 95—11.5 |
| 3,001,461 | 9/61 | Irwin | 95—11.5 |
| 3,005,392 | 10/61 | Kaden | 95—11.5 |
| 3,029,719 | 4/62 | Distel | 95—10 |
| 3,076,394 | 2/63 | Swarofsky | 95—10 |

NORTON ANSHER, *Primary Examiner.*

DELBERT B. LOWE, JOHN M. HORAN, *Examiners.*